United States Patent [19]
Gamm

[11] Patent Number: 4,528,998

[45] Date of Patent: Jul. 16, 1985

[54] BUTTON LATCH FOR TELESCOPED TUBES

[75] Inventor: Paul B. Gamm, Cincinnati, Ohio

[73] Assignee: Jung Corporation, Cincinnati, Ohio

[21] Appl. No.: 669,236

[22] Filed: Nov. 7, 1984

[51] Int. Cl.[3] ........................... A45B 9/00; F16B 7/10

[52] U.S. Cl. ............................... 135/75; 135/DIG. 9; 403/108

[58] Field of Search ....................... 135/75, 69, 65, 66, 135/67, 107, 108, DIG. 9, 37, 38, 39, 40, 41; 403/108, 327, 328, 326, DIG. 6

[56] References Cited

U.S. PATENT DOCUMENTS 2,187,372 1/1940 Capaldo ........................... 135/75 X
2,685,353 8/1954 Caskie ................................ 403/108
3,219,157 11/1965 Gordon .............................. 403/108
3,712,652 1/1973 Uilkema ............................. 403/108
3,905,712 9/1975 McConnell ..................... 211/208 X
3,947,140 3/1976 Thomas .
4,085,763 4/1978 Thomas ................................ 135/69

FOREIGN PATENT DOCUMENTS 2254953 5/1974 Fed. Rep. of Germany ...... 403/108
201756 2/1966 Sweden ................................ 135/41

*Primary Examiner*—Robert A. Hafer
*Assistant Examiner*—Arnold W. Kramer
*Attorney, Agent, or Firm*—Wood, Herron & Evans

[57] ABSTRACT

A spring loaded button, positioned interiorly of an inner tube, protrudes through a hole in the inner tube into latched relation with a preselected one of a series of longitudinally spaced holes in a telescoped outer tube. The button is manually depressed inwardly of the outer tube when the relative position of the inner and outer tubes is to be changed, the button thereafter being released to spring out through another hole in the outer tube to hold the tubes in a different relative position. A catch lip is mounted on the outer end of the button. The catch lip is sized to engage the edge of the outer tube's hole in the event of a slight longitudinal and/or oscillatory movement between tubes to tend to impede or hinder premature and undesired unlatching during normal use of the tubes. But the catch lip is not sized to prevent manual unlatching movement of the button against the spring bias when a position change between tubes is desired.

11 Claims, 3 Drawing Figures

BUTTON LATCH FOR TELESCOPED TUBES

This invention relates to latches. More particularly, this invention relates to latches for tubes that telescope relative one to the other.

Telescoping tubular members are commonly used as structural elements in products where the length of a structural element needs to be selectively adjustable. Such an end use occurs in certain products used by medical patients or by the elderly or by the infirm. Typical of such patient aid type products which make use of adjustable length structural elements are canes, walkers, crutches, commodes, bed siderails, and the like.

In the case of a cane, and particularly in the case of a quad-cane, the height of the cane's handle relative to floor level must be adjustable in order to make the cane usable by persons of different height. In this situation, it is known to fabricate the cane's post from upper and lower tubular post members that are telescopable relative one to the other. The cane's handle is attached to the top end of the upper post member, and the cane's base is connected to the bottom end of the cane's lower post member. It is also known to the prior art to provide a latch by which the two post members elements are held in a preselected desired relation relative one to the other so as to properly position, relative to the desires of the cane's user, the cane's handle above floor level. A typical latch known for use with canes involves a spring loaded button mounted through a hole of an inner tubular post member that latchingly cooperates with one of a series of longitudinally spaced holes along the length of an outer tubular post member. The button may be tapered to provide a generally frusto-conical cross-section with the outer tube's holes being sized to contact the button along its tapered surface in order to effect the latch, and with the inner tube's hole being sized to permit the button to slide therethrough. This permits the tapered latch button to positively engage the hole in the outer tube at all times, regardless of the amount of wear that might be imparted to an outer tube's hole during the useful life of the cane. A button latch for telescoped tubes of this type is more particularly disclosed in Thomas U.S. Pat. No. 3,947,140.

In the case of certain patient aid type products, and particularly in the case of quad-canes, there is a problem that arises with the aforementioned type of button latch upon prolonged use of the cane in certain circumstances. The button latch problem that arises is based on the fact that the cane's user, which often is an elderly person, sometimes tends to try to rotate the handle tube relative to the base tube as he or she leans down with his or her weight on the cane's handle. This tends to effect a oscillatory type movement for the upper tube while also effecting a downward movement of that upper tube, all relative to the lower tube which remains stationary as the cane's base sits on the floor. In other words, the cane's upper tube may be subjected to oscillatory forces while simultaneously it may be subjected to a longitudinal force, all relative to the cane's lower tube. This situation periodically occurs when an elderly person uses the quad-cane because the person may be nervous or otherwise shaky in his or her use of the cane. And when the cane is subjected to these oscillatory and longitudinal forces, same may interact on the tapered latch button in such a fashion that the tapered button is worked out of latched relation with the cane's outer tube. If an elderly person is relying or leaning on the cane when the tapered latch button works itself out of the cane's outer tube in response to the oscillatory and longitudinal force movements imparted to the cane's upper tube, then the cane's outer tube will telescope relative to the inner tube. This, from a practical standpoint, means that the cane collapses, i.e., that the cane's handle drops toward floor level. And this, of course, could result in a bad fall for the cane's user, especially when the user is elderly.

Accordingly, it has been the objective of this invention to provide an improved button latch for telescoped tubes where a spring loaded button is provided with a catch lip at that end which extends through an outer tube, the catch lip tending to cooperate with the peripheral edge of the outer tube's hole if the latch button is inadvertently depressed inwardly toward the inner tube in response to an oscillatory and/or longitudinal force exerted on one tube relative to the other, thereby tending to provide a safety catch which will impede or hinder disengagement of the latched relationship of the telescoped tubes unless and until same is desired by the cane's user.

In accord with this objective, the button latch for telescoped tubes of this invention includes a spring loaded button, positioned interiorly of an inner tube, that protrudes through a hole in the inner tube into latched relation with a preselected one of a series of longitudinally spaced holes in a telescoped outer tube. The button is manually depressed inwardly of the outer tube when the relative position of the inner and outer tubes is to be changed, the button thereafter being released to spring out through another hole in the outer tube to hold the tubes in a different relative position. A catch lip is mounted on the outer end of the button. The catch lip is sized to engage the edge of the outer tube's hole in the event of a slight longitudinal and/or oscillatory movement between tubes to tend to impede or hinder premature and undesired unlatching during normal use of the tubes. But the catch lip is not sized to prevent manual unlatching movement of the button against the spring bias when a position change between tubes is desired.

Other objectives and advantages of this invention will be more apparent from the following detailed description taken in conjunction with the drawings in which.

Figure 1:
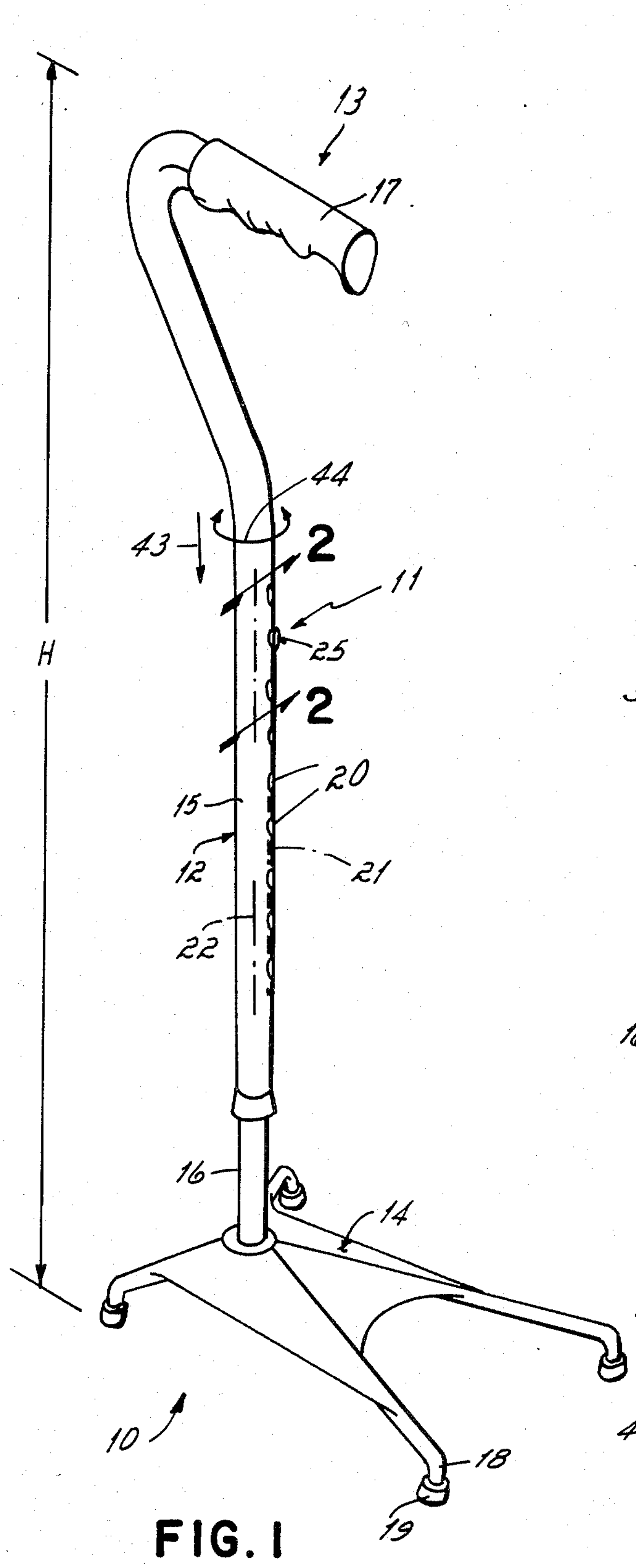
FIG. 1 is a perspective view of a quad-cane that incorporates a button latch in accord with the principles of this invention.

A quad-cane 10 that embodies the improved button latch 11 in accord with the principles of this invention is illustrated in FIG. 1. The quad-cane 10 basically includes a centerpost 12, a handle 13 at the top end of the centerpost, and a base 14 at the bottom of the centerpost. The centerpost 12 is comprised of an outer and upper tube 15, and an inner and lower tube 16. The centerpost tubes 15, 16 are telescopable relative one to the other. The upper centerpost tube 15 carries a hand grip 17 at the top end thereof to form handle 13, the hand grip being adapted for use by the cane's owner. The bottom end of the lower centerpost tube 16 is fixed to the cane's base 14. The cane's base 14 includes four legs 18 each with a separate rubbered foot 19. The button latch 11, which is more particularly described below, retains the inner 16 and outer 15 centerpost tubes in preselected desired telescoped position relative one to the other so as to establish the preferred height H of the cane's handle 13 above floor level.

Figure 2:
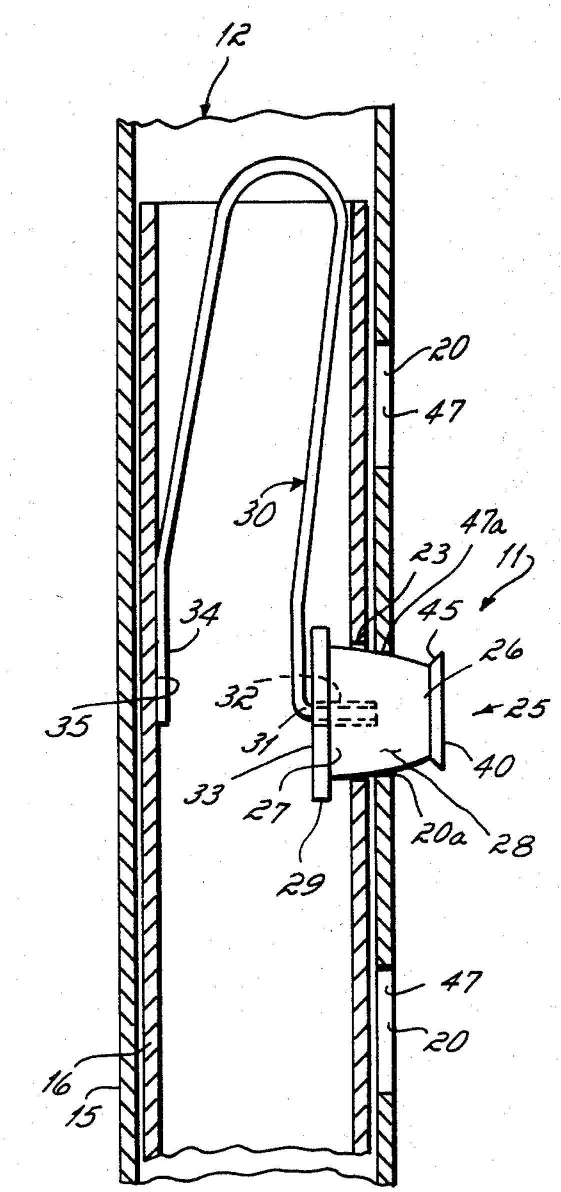
FIG. 2 is a cross-sectional view taken along line 2—2 of FIG. 1.
Figure 3:
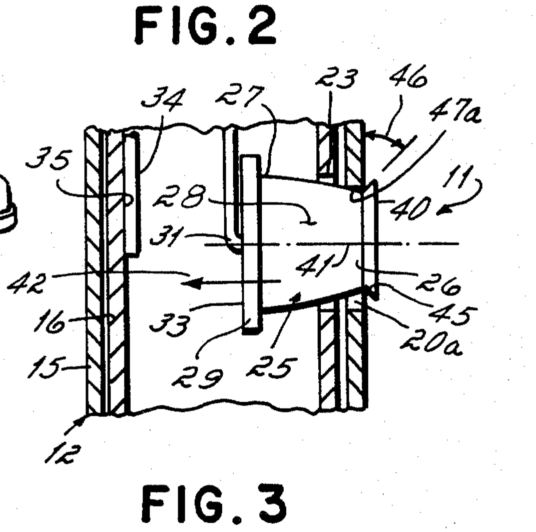
FIG. 3 is a cross-sectional view similar to FIG. 2, but illustrating operative engagement of the tapered button's catch lip with the cane's outer tube.

The button latch 11 for telescoped tubes 15, 16 in accord with the principles of this invention is more particularly illustrated in FIGS. 2 and 3. As shown in FIGS. 1 and 2, the outer centerpost tube 15 is provided with a series of holes 20 in its wall longitudinally spaced one from the other along a length of that tube. The holes are all oriented on a line 21 parallel to the axis 22 of tube 15. The inner centerpost tube 16 is provided with a single hole 23 in its wall. The cross-sectional geometry of the holes 20, 23 in the inner 16 and outer 15 tubes is the same and, in the example shown, is circular. The cross-sectional area of all holes 20 in the outer tube 15 is the same, but that cross-sectional area is less than the cross-sectional area of the one hole 23 in the inner tube 16. In the example shown, the diameter of the holes 20 in the outer tube 15 are all the same, but that diameter is less than the diameter of the hole 23 in the inner tube 16. Note all holes 20, 23 in both tubes 15, 16 are squared off as same are bored through the tubes' walls.

A tapered button 25 is positioned interiorly of the inner tube 16. The tapered button 25 is received through the inner tube's hole 23, and is adapted to project through one of the outer tube's holes 20, as shown in FIG. 2, in order to latch the telescoped tubes 15, 16 in a preselected position relative one to the other. The cross-sectional configuration of the button 25 is the same as the cross-sectional configuration of the holes 20, 23 in the inner 16 and outer 15 tubes, e.g., circular in the embodiment shown in the drawings. The cross-sectional area of the button 25 varies from its outer end 26 to its inner end 27 so that a tapered outer surface 28 is provided to that button between its outer end and inner end. Specifically, the cross-sectional area of the button's outer end 26 is less than the cross-sectional area of the holes 20 in the outer tube 15, and is also less than the cross-sectional area of the hole 23 in the inner tube 16, so that the button can project through the holes in both tubes. However, the button's tapered outer surface 28 is such that the cross-sectional area at some location between the button's outer 26 and inner 27 ends increases to the point where that section of the button will not pass through the holes 20 in the outer tube 15, and further increases to the point at its inner end where the button cannot pass through the hole 23 in the inner tube 16. It is preferred in this latter regard that a shoulder 29 be provided on the button 25 at its inner end 27 to insure that it does not pass through the inner tube's hole 23. More specifically, and when the tapered button 25 is of a frusto-conical configuration as shown in the drawings, the diameter of the button increases from its outer end 26 to its inner end 27 in order to provide the desired dimensional relationship so as to insure that the button will partially pass through the holes 20 in the outer tube 15 but will not completely pass through the holes 23 in either the inner 16 or outer 15 tube. Note particularly that this dimensional relationship, as shown in FIG. 2, results in the outer tube's selected hole **20*a* being seated on the tapered arcuate surface 28 of the button 25 when the tubes 15, 16 are latched together. Even if the selected hole 20*a* grows slightly larger through wear due to hard use of the cane by the cane's owner, the button 25 will always remain seated in that outer tube's hole in light of the button's tapered surface 28**.

A leaf spring 30 is carried in the inner tube 16 for the button 25. One end 31 of the spring 30 is received in axial bore 32 on the button's inner face 33, and the other end 34 of the leaf spring continuously bears against the inner surface 35 of the inner tube 16 opposite the button 25. The leaf spring 30, therefor, continuously spring-biases the button 25 in a radially outward direction relative to the telescoped tubes 15, 16.

A catch lip 40 is provided on the outer end 26 of the tapered button 25. The catch lip 40, which in preferred form is of an annular configuration from cross-sectional geometry and cross-sectional area standpoints is sized so that it can pass through the outer tube's holes 20 but so that it is larger than the outer end 26 of the tapered button. In other words, the catch lip 40 extends radially outward from the button's longitudinal axis 41 beyond the outer end 26 of the button 25. And the catch lip 40 is sized to engage that one **20*a* of the outer tube's holes 20 through which the tapered button 25 extends in order to tend to prevent undesired unlatching movement (see phantom arrow 42) of the button through the outer tube's hole 20*a* in response to longitudinal (see phantom arrow 43) and oscillatory (see phantom arrow 44) movement of one tube 15 relative to the other tube 16. But the catch lip 40 is not sized, i.e., is not big enough, to prevent manual unlatching movement of the tapered button 25 from the outer tube 15 when desired. The catch lip 40 itself defines a frusto-conical surface 45 which, in cross-section relative to the wall of the outer tube 15, defines an acute angle 46 which preferably is about 45°. The catch lip 40, therefore, provides a secondary type latch which functions as shown in FIG. 3 to tend to impede or hinder inadvertent unlatching action of the latch button 25 relative to the outer tube 15**.

In use, and as shown in FIG. 2, the normal use position of the button latch 11 for the telescoped tubes 15, 16 is such that the tapered surface 28 of the button 25 contacts the hole periphery 47 in the outer tube 15 so as to latch the outer tube in a desired longitudinal position relative to the inner tube 16. But, for example, when an elderly person is using the quad-cane 10, and when that person, whether through nervousness or otherwise, imparts his weight to the cane while simultaneously tending to oscillate the cane (i.e., when the person exerts a longitudinal force shown by phantom arrow 43 on the outer tube 15 relative to the inner tube 16, and when that person exerts an oscillatory force shown by double-headed phantom arrow 44 of the outer tube relative to the inner tube), under some circumstances the tapered latch button 25 tends to work itself away from the FIG. 2 latching position back through the inner tube's hole 23 as shown by the phantom arrow 42. If the catch lip 40 were not present on the outer end 26 of the latch button 25, the end result of button movement shown by phantom arrow 42 would be that the outer tube 15 and, therefore, the cane's handle 13, would move quite quickly toward floor level once the tapered button withdrew from latching relation with the outer tube. If the elderly person or other user was leaning heavily on the cane 10 at that time, of course, such a quick collapse of the outer tube 15 toward floor level would cause the user to fall. But the catch lip 40 of this invention tends to impede or hinder radially inward movement of the latch button 25 due to exposure of the outer tube 15 to longitudinal 43 and oscillatory 44 forces aforementioned in that the catch lip tends to catch on the top edge area 47a of the outer tube's hole 20a as shown in FIG. 3, thereby tending to prevent the button 25 from being completely removed from latched relation with that outer tube. This structure, therefore, provides a secondary latch or, in a sense, a safety latch feature, which overcomes the problem of the prior art latch discussed hereinabove.

If the FIG. 3 position of the latch button 25 occurs, i.e., if the catch lip 40 does indeed engage the outer tube hole's periphery 47a, then once the cane 10 is picked up to move it from one location to another the tapered button's spring 30 will once again bias the tapered button into the preferred latch position shown in FIG. 2.

Having described in detail the preferred embodiment of my invention, what I desire to claim and protect by Letters Patent is:

1. A button latch assembly for tubes telescoped one within the other, said latch functioning to permit selectively adjustable positioning of one tube relative to the other, said assembly comprising inner and outer tubes, said tubes being telescopable one within the other, a hole in said inner tube's wall, a plurality of holes in said outer tube's wall, the selectively adjustable telescopic positioning of said inner tube relative to said outer tube being accomplished by axial alignment of said inner tube hole with any one of said outer tube holes, a tapered button positioned within said inner tube hole for axial movement relative to the axis of that hole, said button having an inner end located within said inner tube's interior that prevents passage of said button through said inner tube's hole, said button having a body that tapers from said button's inner end to said button's outer end so that said button's tapered body extends through said inner tube's hole and a selected one of said outer tube's holes, and said button's outer end being located exteriorly of said outer tube with said button's tapered surface engaging said selected one outer tube hole for latching said inner tube and said outer tube in desired telescopic position, a spring connected with said button, said spring continuously biasing said button outwardly of said inner tube's hole, but permitting said button to be manually biased inwardly of said selected one of said outer tube's holes for repositioning said outer tube relative to said inner tube when desired, and a catch lip on said button's outer end, said catch lip extending radially outward from said button's longitudinal axis, said catch lip being sized to engage said selected one of said outer tube's holes to impede undesired unlatching movement of said button through said outer tube's hole in response to at least one of longitudinal and oscillatory movement of said outer tube relative to said inner tube, but said catch lip not being sized to prevent manual unlatching movement of said button from said outer tube when desired.

2. An assembly as set forth in claim 1, the centers of said outer tube holes being on a line parallel to the longitudinal axis of said outer tube.

3. An assembly as set forth in claim 1, said outer tube holes being circular, and the tapered surface of said button being generally frusto-conical in cross-section geometry.

4. An assembly as set forth in claim 1, said catch lip comprising a slanted surface adapted to engage the periphery of said selected one of said outer tube's holes, said lip's slanted surface defining a general acute angle with said outer tube's outer surface when so engaged.

5. An assembly as set forth in claim 1, said catch lip comprising an annular lip that extends around the periphery of said button's outer end.

6. An assembly as set forth in claim 1, said tubes comprising structural elements of a cane, a walker, a crutch, a commode, or a bedrail.

7. A cane comprising a handle, a post having inner and outer tubes, said tubes being telescopable relative one with the other, and said handle being connected to a free end of one of said tubes, and a button latch for latching said telescoped tubes in a predetermined selectively adjustable position relative one to the other in order to adjust the height of said handle relative to ground, said button latch comprising a hole in said inner tube's wall, a plurality of holes in said outer tube's wall, the selectively adjustable telescopic positioning of said inner tube relative to said outer tube being accomplished by axial alignment of said inner tube hole with any one of said outer tube holes, a tapered button positioned within said inner tube hole for axial movement relative to the axis of that hole, said button having an inner end located within said inner tube's interior that prevents passage of said button through said inner tube's hole, said button having a body that tapers from said button's inner end to said button's outer end so that said button's tapered body extends through said inner tube's hole and a selected one of said outer tube's holes, and said button's outer end being located exteriorly of said outer tube with said button's tapered surface engaging said selected one outer tube hole for latching said inner tube and said outer tube in desired telescopic position, a spring connected with said button, said spring continuously biasing said button outwardly of said inner tube's hole, but permitting said button to be manually biased inwardly of said selected one of said outer tube's holes for repositioning said outer tube relative to said inner tube when desired, and a catch lip on said button's outer end, said catch lip extending radially outward from said button's longitudinal axis, said catch lip being sized to engage said selected one of said outer tube's holes to impede undesired unlatching movement of said button through said outer tube's hole in response to at least one of longitudinal and oscillatory movement of said outer tube relative to said inner tube, but said catch lip not being sized to prevent manual unlatching movement of said button from said outer tube when desired.

8. A cane as set forth in claim 7, the centers of said outer tube holes being on a line parallel to the longitudinal axis of said outer tube.

9. A cane as set forth in claim 7, said outer tube holes being circular, and the tapered surface of said button being generally frusto-conical in cross-section geometry.

10. A cane as set forth in claim 7, said catch lip comprising a slanted surface adapted to engage the periphery of said selected one of said outer tube's holes, said lip's slanted surface defining a general acute angle with said outer tube's outer surface when so engaged.

11. A cane as set forth in claim 7, said catch lip comprising an annular lip that extends around the periphery of said button's outer end.

* * * * *